(12) United States Patent
Shimizu

(10) Patent No.: US 7,986,378 B2
(45) Date of Patent: Jul. 26, 2011

(54) LIQUID CRYSTAL DISPLAY DEVICE, ITS DRIVE METHOD, LIQUID CRYSTAL PANEL DRIVE DEVICE, AND LIQUID CRYSTAL PANEL DRIVE METHOD

(75) Inventor: Masahiro Shimizu, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 12/441,602

(22) PCT Filed: Sep. 11, 2007

(86) PCT No.: PCT/JP2007/067642
§ 371 (c)(1),
(2), (4) Date: Mar. 17, 2009

(87) PCT Pub. No.: WO2008/035588
PCT Pub. Date: Mar. 27, 2008

(65) Prior Publication Data
US 2010/0026922 A1 Feb. 4, 2010

(30) Foreign Application Priority Data
Sep. 20, 2006 (JP) ................ 2006-255014

(51) Int. Cl.
*G02F 1/1343* (2006.01)
(52) U.S. Cl. ........................................... 349/39
(58) Field of Classification Search .............. None
See application file for complete search history.

(56) References Cited

U.S. PATENT DOCUMENTS

| 6,933,916 | B2 | 8/2005 | Nakao |
| 7,023,416 | B1 | 4/2006 | Nakamura et al. |
| 2001/0020925 | A1 | 9/2001 | Hattori et al. |
| 2002/0105613 | A1 | 8/2002 | Yamakita et al. |
| 2002/0145579 | A1 | 10/2002 | Yamakita et al. |

(Continued)

FOREIGN PATENT DOCUMENTS

JP 09-138421 5/1997

(Continued)

OTHER PUBLICATIONS

International Search Report for PCT/JP2007/067642, mailed Nov. 13, 2007.

*Primary Examiner* — Sung H Pak
(74) *Attorney, Agent, or Firm* — Nixon & Vanderhye, P.C.

(57) ABSTRACT

An active matrix substrate is provided to be opposed to a counter substrate with a liquid crystal layer therebetween, the liquid crystal layer being in an OCB mode in which orientation is spray orientation when no voltage is applied and the orientation is changed to bend orientation when a voltage is applied. A storage capacitor bus line is provided on a pixel electrode so as to be opposite to the counter substrate and an opening is provided at a part of the pixel electrode at a region where the pixel electrode and the storage capacitor bus line intersect. A liquid crystal control circuit and a relay circuit are provided for applying a transition voltage to the storage capacitor bus line so as to apply an electric field between the pixel electrode and the storage capacitor bus line, and after a certain period in which liquid crystal molecules have responded, applying a transition voltage to the counter electrode so as to apply an electric field between the pixel electrode and the counter electrode.

14 Claims, 8 Drawing Sheets

U.S. PATENT DOCUMENTS

| | | |
|---|---|---|
| 2002/0149551 A1 | 10/2002 | Yamakita et al. |
| 2003/0090442 A1 | 5/2003 | Hattori et al. |
| 2003/0122767 A1 | 7/2003 | Nakao et al. |
| 2003/0151710 A1 | 8/2003 | Tanaka et al. |
| 2004/0222958 A1 | 11/2004 | Nakamura et al. |
| 2007/0176888 A1 | 8/2007 | Hattori et al. |
| 2010/0110355 A1* | 5/2010 | Okazaki et al. ............... 349/123 |
| 2010/0134396 A1* | 6/2010 | Umezaki ..................... 345/92 |

FOREIGN PATENT DOCUMENTS

| | | |
|---|---|---|
| JP | 10-020284 | 1/1998 |
| JP | 2003-121881 | 4/2003 |
| JP | 2003-295226 | 10/2003 |
| JP | 2003295226 A * | 10/2003 |

* cited by examiner

LIQUID CRYSTAL DISPLAY DEVICE, ITS DRIVE METHOD, LIQUID CRYSTAL PANEL DRIVE DEVICE, AND LIQUID CRYSTAL PANEL DRIVE METHOD

This application is the U.S. national phase of International Application No. PCT/JP2007/067642, filed 11 Sep. 2007, which designated the U.S. and claims priority to Japanese Patent Application No. 2006-255014, filed 20 Sep. 2006, the entire contents of each of which are hereby incorporated by reference.

TECHNICAL FIELD

The present invention relates to a liquid crystal display device, its drive method, a liquid crystal panel drive device and a liquid crystal panel drive method, to each of which an OCB (Optically self-Compensated Birefringence) mode is applied.

BACKGROUND ART

Conventionally, color liquid crystal display devices have been popularly used as color display devices having such features as flatness, lightweight, and the like. In recent years, a color liquid crystal display device having properties of a high contrast and a broad viewing angle has been developed thanks to advancement in a liquid crystal technique. The color liquid crystal display device is widely put into practice as the mainstream of a large-scale display.

Examples of currently widely used display modes of the color liquid crystal display device include: a twisted nematic mode (hereafter referred to as "TN mode") for performing display by controlling optical rotation of a liquid crystal layer by an electric field; a birefringence mode (hereafter referred to as "ECB mode") for performing display by controlling birefringence of the liquid crystal layer by the electric field; and the like.

However, in the color liquid display devices to which any of these modes is applied, a response speed is still slow, a phenomenon of a lasting image occurs, and a contour is blurred Therefore, there is a problem that such a color liquid display device is not suitable to display a moving image.

Accordingly, a large number of attempts to increase the response speed of the color liquid crystal display device have conventionally been made. Currently, examples of a liquid crystal mode capable of rapidly responding so as to be suitable to display the moving image include: a ferroelectric liquid crystal mode; an anti-ferroelectric liquid crystal mode; an OCB (Optically self-Compensated Birefringence) mode; and the like.

Out of such modes, it is known that the ferroelectric liquid crystal mode and the anti-ferroelectric liquid crystal mode is quite susceptible to mechanical impact because of their layered structure and thus there are a lot of problems in putting the modes into practice.

On the other hand, the OCB mode in which a normal nematic liquid crystal is used has a high shock resistance and is also workable in a wide temperature range. The OCB mode has a broad viewing angle and rapid response. Therefore, the OCB mode is recognized as the most suitable liquid crystal mode to display the moving image.

FIG. 7 is a schematic cross-sectional view of an essential part of a liquid crystal display device to which the OCB mode is applied. As illustrated in FIG. 7, in a liquid crystal display device 100 to which the OCB mode is applied, a liquid crystal layer 103 is sandwiched by transparent glass substrates 101 and 102. A pixel electrode 104 and a counter electrode 105 are transparent electrodes. The pixel electrode 104 and the counter electrode 105 as well as alignment films 106 and 107 which film the pixel electrode 104 and the counter electrode 105, respectively are provided on the glass substrates 101 and 102 so as to face the liquid crystal layer 103. The alignment films 106 and 107 have been subjected to aligning treatment by rubbing.

In the liquid crystal display device 100, in order to perform color display, a color filter (not illustrated) is produced on one side of the glass substrate 102. Furthermore, in order to drive the liquid crystal layer 103 in an active matrix mode, there are produced a gate bus line and a source bus line on one side of the glass substrate 101 as well as a TFT at a part where the gate bus line and the source bus line intersect (The gate bus line, the source bus line and the TFT are not illustrated). After both the glass substrates 101 and 102 are individually produced, the substrates are combined to each other with a globular spacer or a pillar spacer (not illustrated) therebetween to appropriately provide a gap. The liquid crystal layer 103 is formed by vacuum filling between both the glass substrates 101 and 102 combined to each other or by one drop filling when the glass substrates 101 and 102 are combined to each other. To one side or both sides of a liquid crystal cell thus obtained, a wave plate (not illustrated) is combined so as to improve the viewing angle property in display, and a polarizer (not illustrated) is combined to an outer side of the wave plate.

As illustrated in FIG. 8, liquid crystal molecules 103a are often oriented substantially horizontally in the liquid crystal layer 103 just after liquid crystal is filled thereinto. Such a state is called an initial orientation (spray orientation). When a desired voltage is applied to the pixel electrode 104 and the counter electrode 105 which are below and above the liquid crystal layer 103, respectively, the orientation of the liquid crystal molecules 103a in the liquid crystal layer 103 is sequentially changed from the spray orientation illustrated in FIG. 8 to bend orientation illustrated in FIG. 7. Once the liquid crystal molecules 103a have the bend orientation illustrated in FIG. 7, the orientation of the liquid crystal molecules 103a is rapidly changed during white display (refer to FIG. 9) and black display (refer to FIG. 10). This allows the liquid crystal molecules 103a to rapidly respond. For this reason, use of the OCB mode enables the most rapid display of the modes to which the nematic liquid crystal is applied. Moreover, a display state having the property of the broader viewing angle is realized by combining the OCB mode with the wave plate.

As described above, the orientation in the OCB mode is the spray orientation when no voltage is applied. In the case of actual performance of display, display is performed in a state where the bend orientation occurs. That is, in the liquid crystal display device 100 to which the OCB mode is applied, the bend orientation is maintained by constantly applying a voltage to the liquid crystal layer 103 when display is performed. For example, as illustrated in FIG. 9, the white display is performed when a voltage $V_L$ is applied. On the other hand, as illustrated in FIG. 10, the black display is performed when a voltage $V_H$ is applied. Furthermore, provided that a halfway state is displayed when a voltage between the voltage $V_L$ and the voltage $V_H$ is applied, the liquid crystal layer 103 has the bend orientation in a range of the voltages $V_L$ to $V_H$.

In the OCB mode, the liquid crystal layer 103 in the display state keeps the bend orientation by a voltage being constantly applied thereto. On the other hand, in a state where a power supply of the liquid crystal display device 100 is off, the liquid crystal layer 103, to which no voltage is applied, has the spray orientation. For this reason, when the power supply of the liquid crystal display device 100 is turned on, the orientation in the liquid crystal layer 103 is changed from the spray orientation to the bend orientation (hereafter referred to as "transition from spray to bend").

However, as disclosed in Patent Literatures 1 and 2, for example, it is known that the transition from spray to bend requires a high voltage or much time. The time for the transition from spray to bend to be carried out in the entire screen depends on a voltage to be applied to the liquid crystal layer 103.

Here, FIG. 11 shows a relationship between a voltage applied to the liquid crystal layer 103 at a room temperature (+25° C.) and a transition time required for the transition from spray to bend. In FIG. 11, an area of the electrode and a thickness of the cell are set as 1 cm$^2$ and 5 μm, respectively. FIG. 11 shows that the transition time for the transition from spray to bend becomes shorter as the voltage to be applied to the liquid crystal layer 103 grows higher.

On the other hand, when a state of the transition from spray to bend is observed, it can be seen that the transition occurs from a specific place where several spacers are aggregated. Such a place is called transition nucleus. There are some cases where only several pieces of the transition nucleus are formed within 1 cm$^2$, which elongates the time for the transition from spray to bend to be spread to the entire screen. A speed for the transition from spray to bend to be spread depends on viscosity of the liquid crystal. For example, at a low temperature of −30° C., the viscosity is greatly increased and thus the speed for the transition from spray to bend to be spread is 100 times or so lower than that at the room temperature.

In order to prevent such a problem, as illustrated in FIG. 12, Patent Literature 3 discloses a configuration such that a protrusion 201 composed of an electroconductive material or a recess (not illustrated) is formed at a predetermined position in the screen. With such a configuration, intensity of an electric field which is applied to the liquid crystal layer 203 on the protrusion 201 or the recess (not illustrated) is greater than intensity of an electric field of a circumference thereof. This promotes formation of the transition nucleus. Forming such a transition nucleus in each of the pixels facilitates the transition from spray to bend in all the pixels.

Moreover, as illustrated in FIG. 13, Patent Literature 4 discloses drive means for causing a potential difference between an auxiliary capacitor electrode 301 and a pixel electrode 303 which is provided so as to overlap the auxiliary capacitor electrode 301 via an insulator 302 and includes a cutaway portion 303a. With such a configuration, intensity of an electric field to be applied between the auxiliary capacitor electrode 301 and the pixel electrode 303 grows higher than intensity of an electric field of other areas and thereby the liquid crystal molecules provided on a periphery of the cutaway portion 303a become the transition nucleus. This facilitates the transition from spray to bend in all the pixels.

In this way, Patent Literatures 3 and 4 disclose that making a structure to form the transition nucleus for all the pixels allows the transition from spray to bend to be carried out in all the pixels, i.e. in the entire screen even if there is an isolated space where no voltage is applied to the liquid crystal layer.

Furthermore, in order to complete the transition from spray to bend in the entire screen, it is necessary to individually form the transition nucleus in each of the pixels. Patent Literature 2 shows that it is effective to apply a transverse electric field to the liquid crystal so as to form the transition nucleus.

CITATION LIST

Patent Literature 1
Japanese Patent Application Publication, Tokukai, No. 2002-14317 (Publication Date: Jan. 18, 2002) (Corresponding U.S. Pat. No. 7,023,416 (Registration Date: Apr. 4, 2006))
Patent Literature 2
Japanese Patent Application Publication, Tokukai, No. 2003-121881 (Publication Date: Apr. 23, 2003)
Patent Literature 3
Japanese Patent Application Publication, Tokukaihei, No. 10-20284 (Publication Date: Jan. 23, 1998)
Patent Literature 4
Japanese Patent Application Publication, Tokukai, No. 2003-107506 (Publication Date: Apr. 9, 2003) (Corresponding U.S. Patent Application No. 2002/145579 (Publication Date: Oct. 10, 2002), Corresponding U.S. Patent Application No. 2002/105613 (Publication Date: Aug. 8, 2002), Corresponding U.S. Patent Application No. 2002/149551 (Publication Date: Oct. 17, 2002), Corresponding U.S. Pat. No. 6,933,916 (Date of Patent: Aug. 23, 2005))
Patent Literature 5
Japanese Patent Application Publication, Tokukai, No. 2002-6284 (Publication Date: Jan. 9, 2002) (Corresponding U.S. Patent Application No. 2001/020925 (Publication Date: Sep. 13, 2001), Corresponding U.S. Patent Application No. 2003/090442 (Publication Date: May 15, 2003)
Patent Literature 6
Japanese Patent Application Publication, Tokukai, No. 2002-202529 (Publication Date: Jul. 19, 2002) (Corresponding U.S. Patent Application No. 2003/0151710 (Publication Date: Aug. 14, 2003)

SUMMARY OF INVENTION

As described above, a method for applying a transition voltage in the conventional liquid crystal display device requires a high voltage so as to rapidly carry out the transition from spray to bend. Especially, when an operation is to be carried out in an environment at a low temperature, the viscosity of the liquid crystal is extremely high and thus the transition from spray to bend requires much time. Therefore, the operation requires a higher voltage as compared with that at the room temperature. (Refer to Patent Literature 5)

For example, in order to form the transition nucleus at −30° C. without fail, it is necessary to apply a transition voltage of 25V between a storage capacitor bus line and the pixel electrode. Moreover, a transition voltage required for one pixel to complete the transition from spray to bend in one second from one transition nucleus formed is 25V at −30° C.

According to this, when a transition voltage of +25V (or −25V) is applied between the pixel electrode and the counter electrode and a transition voltage of +25V (or −25V) is applied between the pixel electrode and the storage capacitor bus line, a voltage between the storage capacitor bus line and the counter electrode becomes 0V. As a result, an area to which no voltage is applied is made at an opening of the pixel electrode and a spray area remaining thereat prevents the transition from spray to bend which is to be spread to the entire pixel area. For this reason, there is a problem that application of a homopolar (homophase) transition voltage to the counter electrode and the storage capacitor bus line makes it difficult to rapidly carry out the transition from spray to bend.

On the other hand, when a transition voltage of +25V (or −25V) is applied between the pixel electrode and the counter electrode and a transition voltage of −25V (or +25V) is applied between the pixel electrode and the storage capacitor bus line, it is necessary to apply a transition voltage of 50V in total. Application of such a high transition voltage increases electric power consumption and makes it extremely difficult to design a circuit.

In this way, conventionally, for the pixel electrode, it is necessary to apply a high voltage to each of the counter electrode and the storage capacitor bus line. However, there is a problem that the area to which no voltage is applied is made or that a transition voltage required is too high.

The present invention is made in consideration of the aforementioned problems. The object of the present invention is to provide a liquid crystal display device, a drive method thereof, a liquid crystal panel drive device, and a liquid crystal panel drive method, in which the transition nucleus is rapidly formed at a low voltage and thus the transition from spray to bend can be rapidly carried out, when the OCB mode is applied.

In order to solve the aforementioned problem, a liquid crystal display device includes: an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied, the liquid crystal display device further including a storage capacitor bus line provided on the pixel electrode so as to be opposite to the counter substrate with an insulating film between the storage capacitor bus line and the pixel electrode; an opening provided at a part of the pixel electrode at a region where the pixel electrode and the storage capacitor bus line intersect; and a transition voltage application section provided for applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

According to the configuration, the transition voltage application section applies the transition voltage to the storage capacitor bus line and the counter electrode in this order by delaying a timing of the start of application.

In the liquid crystal display device, the transition voltage application section applies a transition voltage to the storage capacitor bus line so as to apply an electric field between the pixel electrode and the storage capacitor bus line, thereby generating a transverse electric field between the storage capacitor bus line and the pixel electrode in the vicinity of the opening.

Thereafter, the transition voltage application section applies a transition voltage to the counter electrode so as to apply an electric field between the pixel electrode and the counter electrode.

As described above, when the transition voltage is applied to the storage capacitor bus line so as to apply the electric field between the pixel electrode and the storage capacitor bus line, the transverse electric field generated between the storage capacitor bus line and the pixel electrode causes the liquid crystal molecules to have twist orientation. As a result, a transition nucleus is formed in each of the pixels. Therefore, when the transition voltage is applied to the counter electrode after application of the transition voltage to the storage capacitor bus line, a large transition electric field is generated between the counter electrode and the pixel electrode and thus the formed transition nucleus can be rapidly spread to the entire pixels. This allows the liquid crystal molecules to rapidly change the orientation from the spray orientation to the bend orientation.

In this way, the liquid crystal display device is designed such that applications of a homopolar (homophase) voltage to the storage capacitor bus line and the counter electrode are not simultaneously performed, but application of a transition voltage to the storage capacitor bus line is firstly performed and thereafter (more specifically, after occurrence of the twist orientation at the opening), application of a transition voltage to the counter electrode is performed. Therefore, with the liquid crystal display device, unlike a conventional technique, the same homopolar transition voltage is not simultaneously applied to the storage capacitor bus line 27 and the counter electrode 32 in the initial state which has an influence on formation of the transition nucleus, and consequently an area to which no voltage is applied is not made at the opening of the pixel electrode and thus it is possible to form the transition nucleus in all the pixels and to rapidly spread the transition nucleus to the entire pixels.

Moreover, when the transition nucleus is formed, a transition voltage is first applied only to the storage capacitor bus line but not to the counter electrode in the initial state. Therefore, a high voltage derived from adding a voltage of the storage capacitor bus line and a voltage of the counter electrode together is unnecessary. The transition nucleus is thus formed at a low voltage.

As a result, when the OCB mode is applied, it is possible to provide a liquid crystal display device which allows rapidly forming the transition nucleus at a low voltage in all the pixels and thus rapidly carrying out the transition from spray to bend.

Furthermore, also at a low temperature where the viscosity of the liquid crystal increases, it is possible to change the orientation of the entire screen to the bend orientation.

Moreover, in order to solve the aforementioned problem, a liquid crystal panel drive device for driving a liquid crystal panel is a device for driving a liquid crystal panel including: an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied; the liquid crystal panel further including a storage capacitor bus line provided on the pixel electrode so as to be opposite to the counter substrate with an insulating film between the storage capacitor bus line and the pixel electrode; and an opening provided at a part of the pixel electrode at a region where the pixel electrode and the storage capacitor bus line intersect, the device including a transition voltage application section provided for applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

Furthermore, in order to solve the aforementioned problem, a liquid crystal panel drive method for driving a liquid crystal panel is a method for driving a liquid crystal panel including: an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied; the liquid crystal panel further including a storage capacitor bus line provided on the pixel electrode so as to be opposite to the counter substrate with an insulating film between the storage capacitor bus line and the pixel electrode; and an opening provided at a part of the pixel electrode at a region where the pixel electrode and the storage capacitor bus line intersect, the method including applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

According to this, when the OCB mode is applied, it is possible to provide a method for driving a liquid crystal display device, a liquid crystal panel drive device, and a liquid crystal panel drive method, panel, each of which allows rapidly forming the transition nucleus at a low voltage in all the pixels and thus rapidly carrying out the transition from spray to bend.

REFERENCE SIGNS LIST

Figure 1:
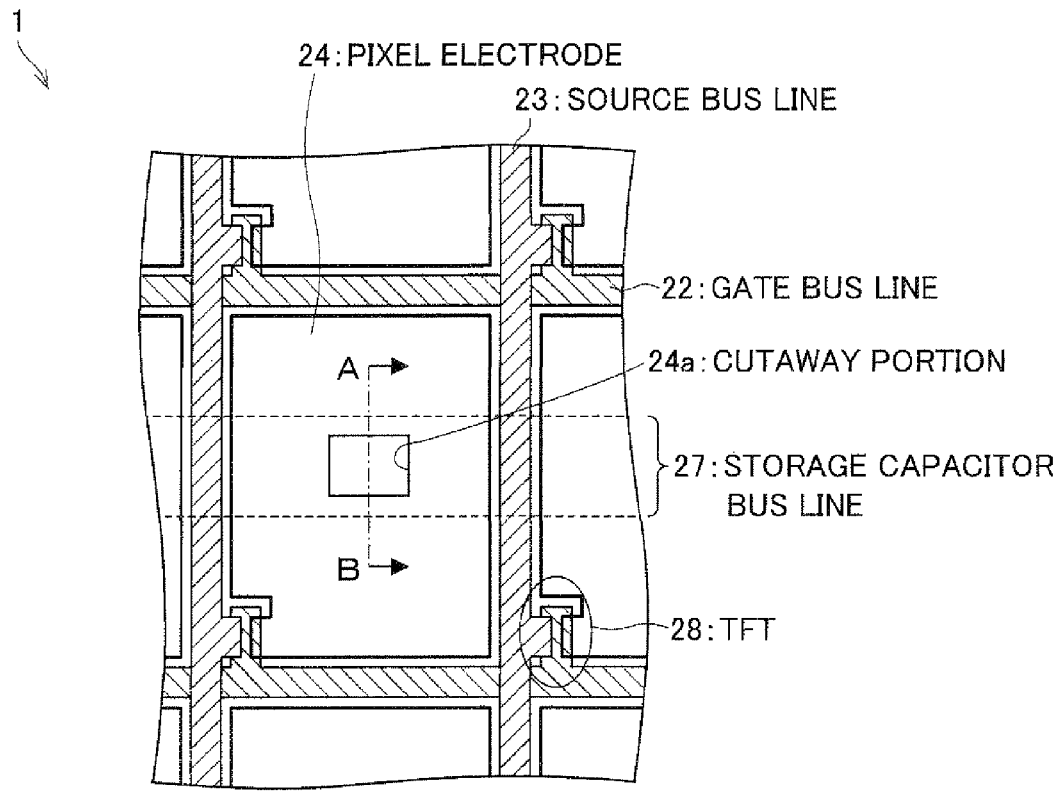
FIG. 1 is a plan view showing a configuration of a pixel of a liquid crystal panel in a liquid crystal display device according to an embodiment of the present invention.

1 Liquid crystal panel
2 Active matrix substrate
3 Counter substrate
4 Liquid crystal layer
10 Liquid crystal display device
11 Signal source
12 Power supply circuit
13 Liquid crystal control circuit (Transition voltage application means, Transition voltage application section)
14 Relay circuit (Transition voltage application means, Transition voltage application section)
21 Glass substrate
22 Gate bus line
23 Source bus line
24 Pixel electrode
24a Cutaway portion (Opening)
26 Alignment film
27 Storage capacitor bus line
28 TFT
31 Glass substrate
32 Counter electrode
33 Alignment film
40 Liquid crystal cell (Liquid crystal panel)
41 Viewing angle compensation wave plate
42 Viewing angle compensation wave plate
43 Polarizer
44 Polarizer
50 Drive circuit (device for driving liquid crystal panel)
51 Wiring (Wiring for power supply signal)
52 Wiring (Wiring for clock signal)
53 Wiring (Wiring for gradation signal)
54 Wiring (Wiring for storage capacitor bus line signal)
55 Wiring (Wiring for counter electrode signal)
56 Wiring (Wiring for orientation transition control signal)
57 Wiring (Wiring for orientation transition control signal)

DESCRIPTION OF EMBODIMENTS

Embodiment 1

One embodiment of the present invention is described below with reference to FIGS. 1 to 5.

Figure 2:
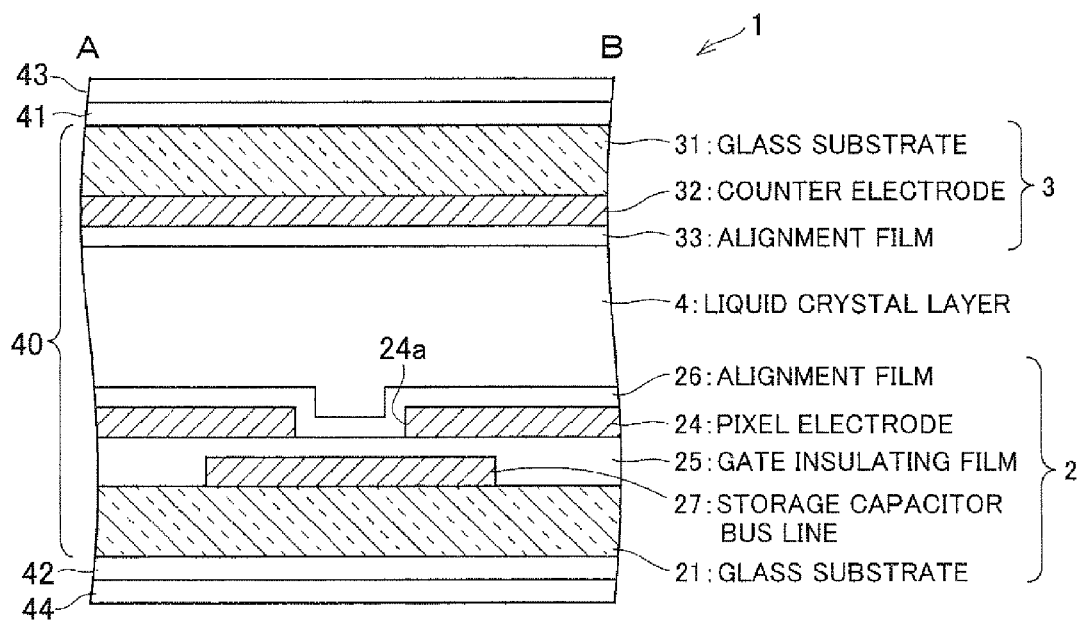
FIG. 2 is a cross-sectional view taken from line A-B of the liquid crystal panel shown in FIG. 1.

First, a configuration of a liquid crystal panel in a liquid crystal display device of the present embodiment is described with reference to FIGS. 1 and 2. FIG. 1 is a plan view showing an outline configuration of one pixel of the liquid crystal panel and the circumference thereof. FIG. 2 is a cross-sectional view taken from line A-B of the liquid crystal panel shown in FIG. 1. Note that an illustration of a counter substrate and a liquid crystal layer is omitted for a simple illustration.

The liquid crystal display device of the present embodiment includes a TFT liquid crystal panel 1 shown in FIGS. 1 and 2 and is configured such that a liquid crystal layer 4 is sandwiched by an active matrix substrate 2 and a counter substrate 3.

Schematically, the active matrix substrate 2 is configured such that a gate bus line 22, a source bus line 23, and a pixel electrode 24 are formed on a glass substrate 21. Furthermore, in the active matrix substrate 2, a gate insulating film 25 is formed between the gate bus line 22 and the source bus line 23. Between the source bus line 23 and the pixel electrode 24, an interlayer insulating film (not illustrated) is formed. On the pixel electrode 24, an alignment film 26 is formed. Moreover, at a region where a storage capacitor bus line 27 is formed so as to be opposed to the pixel electrode 24 via the interlayer insulating film serving as an insulating film and where the pixel electrode 24 and the storage capacitor bus line 27 intersect, a cutaway portion 24a as an opening is provided in a part of the pixel electrode 24. Moreover, the storage capacitor bus line 27 may be formed on the same layer as the gate bus line 22.

On the other hand, the counter substrate 3 is configured such that a counter electrode 32 and an alignment film 33 are formed on the entire surface of a glass substrate 31 for example.

The pixel electrode 24 is connected to the gate bus line 22 and the source bus line 23 via a TFT (Thin Film Transistor) 28, but may be electrically connected to a drain electrode of the TFT 28 by a contact hole (not illustrated) formed in the interlayer insulating film.

Next, a method of producing the liquid crystal panel 1 is described.

First, as for the active matrix substrate 2, the gate bus line 22 and the storage capacitor bus line 27 are produced on the glass substrate 21 having been subjected to such treatment as a base coating. The gate bus line 22 and the storage capacitor bus line 27 are made by forming a metal film on the entire surface of the glass substrate 21 by sputtering so as to pattern the metal film by a photolithography process. The gate bus line 22 thus made is composed of a laminated structure of tantalum (Ta) and its nitride, but the structure needs not to be laminated. The gate bus line 22 may be made of metal, such as titanium (Ti), aluminum (Al), or the like, or ITO (Indium Tin Oxide).

Thereafter, surfaces of the gate bus line 22 and the storage capacitor bus line 27 are anodized, and further the gate insulating film 25 is formed by silicon nitride or the like. The gate insulating film 25 may be either patterned or unpatterned.

Next, in order to form the TFT 28, a semiconductor layer is formed according to a method of CVD (chemical vapor deposition). After patterning of the semiconductor layer by the photolithography process, impurities are injected to form a channel region of the TFT 28. Thereafter, a metal film is formed by sputtering. The metal film is patterned by the photolithography process so as to form the source bus line 23 and the drain electrode. The source bus line 23 is composed of metal, such as tantalum (Ta), titanium (Ti), aluminum (Al), or the like in the same manner as the gate bus line 22 and the storage capacitor bus line 27. Finally, the TFT 28 is covered by the interlayer insulating film (not illustrated) so as to prevent the impurities from being scattered to the TFT 28 portion, thereby attaining better performance of a semiconductor. In this way, the gate bus line 22 and the source bus line 23 as well as the TFT 28 are produced in the active matrix substrate 2.

Next, a metal film is formed by sputtering. The metal film is patterned by the photolithography process so as to form the pixel electrode 24. A film thickness of the pixel electrode 24 is set to 140 nm, for example. Furthermore, for the pixel electrode 24, ITO is used as a transparent electrode, but any transparent thin-film electroconductive substance, such as IZO (Indium Zinc Oxide) or the like is usable. Moreover, in the case of a reflection-type liquid crystal display device, the pixel electrode 24 may be made of a reflective thin-film electroconductive substance, such as aluminum (Al), Silver (Ag), or the like instead of ITO.

Next, a procedure for producing the counter substrate 3 is described.

The counter substrate 3 is produced as follows: a black matrix (not illustrated) partitioning each of the pixels and color filters (not illustrated) of R, G, and B (red, green, and blue) are provided on the glass substrate 31 in a stripe pattern. Thereafter, ITO is sputtered as the counter electrode 32 which is a transparent electrode.

Next, the active matrix substrate 2 and the counter substrate 3 are subjected to a treatment of orienting the liquid crystal. Specifically, polyimide films for parallel alignment are printed on both the active matrix substrate 2 and the counter substrate 3 and baked by an oven for one hour at 200° C. for example, so as to form alignment films 26 and 33. A film thickness of the alignment films after the baking is approximately 100 nm. Top surfaces of the alignment films 26 and 33 are rubbed in one direction with a cotton cloth so that the active matrix substrate 2 and the counter substrate 3 are aligned in parallel with each other when the substrates are combined to each other. Specifically, a proper amount of plastic spacers of 5 µm in diameter is sprayed on the active matrix substrate 2 in a dry manner. On the counter substrate 3, a sealing agent is printed on a circumference of the screen. The active matrix substrate 2 and the counter substrate 3 are combined to each other with the sealing agent after the two substrates are aligned, in such a manner that rubbing directions of the substrates are parallel to each other in the same direction. The seal agent is thermoset resin, and the substrates are pressed and baked by the oven for one and a half hour at 170° C. The liquid crystal is filled by vacuum filling. In this way, a liquid crystal cell 40 used as the liquid crystal panel 1 of the present embodiment is produced.

Next, a pretilt angle formed by the alignment films 26 and 33 is measured by a cell produced under the same conditions. In order to measure the pretilt angle, the cell is produced in such a manner that rubbing directions of the substrates are parallel to each other in the opposite direction. A pretilt angle of this cell is about 8°.

Furthermore, when the pretilt angle increases, the bend orientation seems to be spread more rapidly. This is because free energy becomes lower in the bend orientation than that in the spray orientation as the pretilt angle increases. For example, when the pretilt angle is 45° or more, the bend orientation is more stabilized even if no voltage is applied.

Moreover, in the present embodiment, the liquid crystal panel 1 is configured to further include viewing angle compensation wave plates 41 and 42 as well as polarizers 43 and 44 so as to increase the viewing angle. Specifically, the liquid crystal panel 1 is produced by combining the viewing angle compensation wave plates 41 and 42 to both sides of the liquid crystal cell 40 and combining, from outer sides thereof, the polarizers 43 and 44 (not illustrated) to both sides of the liquid crystal cell 40 so that absorption axes of the polarizers cross each other at a right angle.

Figure 3:
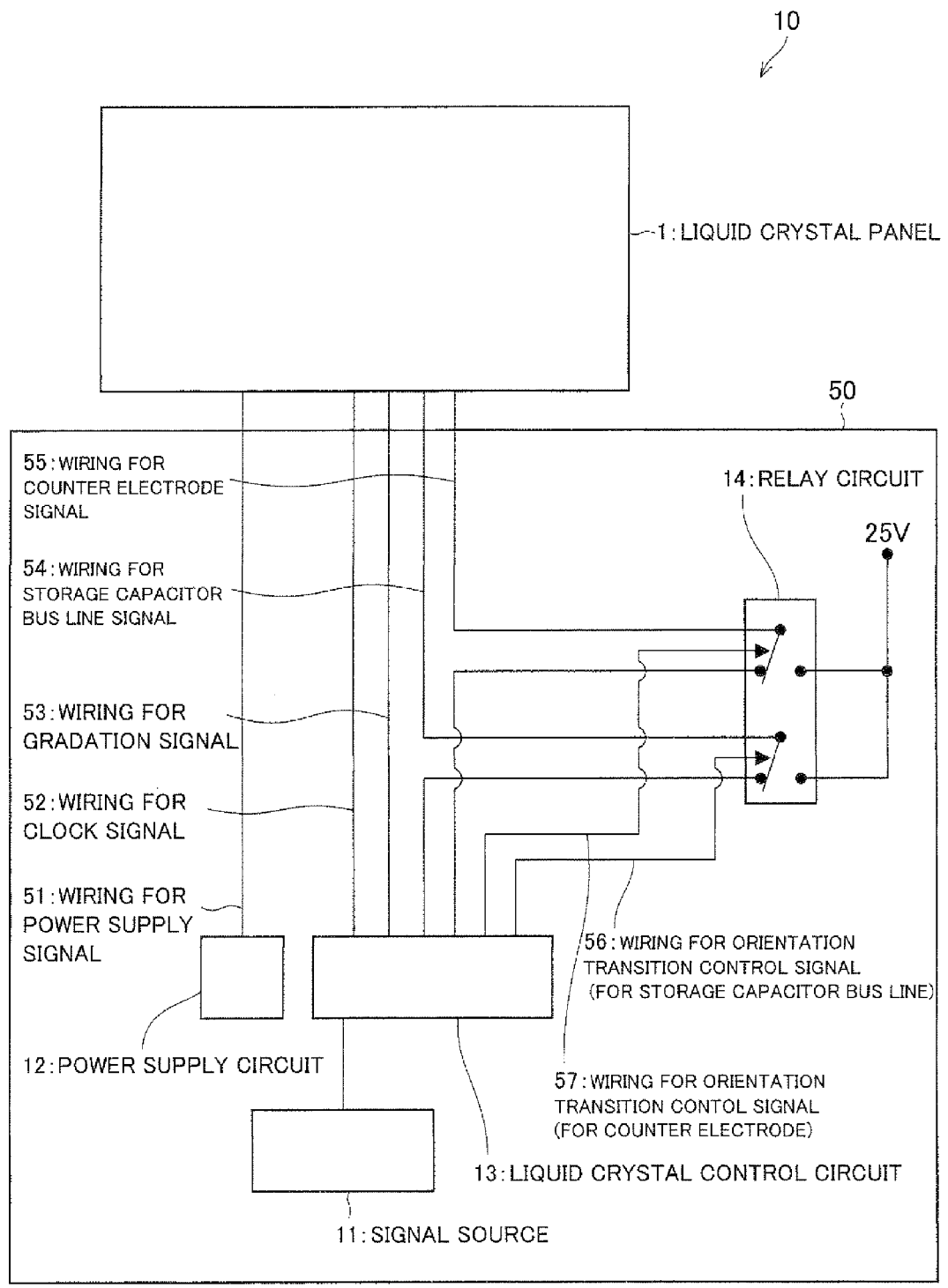
FIG. 3 is a block diagram showing a configuration of the liquid crystal display device according to the embodiment of the present invention.

Next, a drive circuit in a liquid crystal display device including the liquid crystal panel 1 is described with reference to FIG. 3. FIG. 3 is a block diagram showing the drive circuit in the liquid crystal display device.

As illustrated in FIG. 3, a liquid crystal display device 10 of the present embodiment is provided with the liquid crystal panel 1 and a drive circuit 50 (drive device of the liquid crystal panel 1). In the drive circuit 50, a signal source 11, a power supply circuit 12, a liquid crystal control circuit 13, and a relay circuit 14 are provided, as illustrated in FIG. 3.

The power supply circuit 12 is electrically connected to the liquid crystal panel 1 via a wiring 51 for a power supply signal. Furthermore, between the liquid crystal panel 1 and the liquid crystal control circuit 13, a wiring 52 for a clock signal, a wiring 53 for a gradation signal, a wiring 54 for the storage capacitor bus line (for a storage capacitor bus line signal) and a wiring 55 for a counter electrode signal. Out of such wirings, the wiring 54 for the storage capacitor bus line and the wiring 55 for the counter electrode signal are electrically connected to the liquid crystal panel 1 via the relay circuit 14. Moreover, between the liquid crystal control circuit 13 and the relay circuit 14, a wiring 56 for an orientation transition control signal to be inputted into the storage capacitor bus line 27 and a wiring 57 for an orientation transition control signal to be inputted into the counter electrode 32 are provided. The liquid crystal control circuit 13 and the relay circuit 14 serve as a transition voltage application section (transition voltage application means).

In the drive circuit 50 in the liquid crystal display device 10, a signal outputted from the signal source 11 is received by the liquid crystal control circuit 13. The liquid crystal display circuit 13 generates a clock signal, a gradation signal, a storage capacitor bus line signal and a counter electrode signal which are necessary for the liquid crystal panel 1. Each of these signals is inputted into the liquid crystal panel 1 via the wirings 52 to 55 illustrated in FIG. 3. Moreover, out of such signals, the storage capacitor bus line signal and the counter electrode signal are inputted into the liquid crystal panel 1 by way of the relay circuit 14. The relay circuit 14 applies a voltage of 25V to each of the storage capacitor bus line 27 and the counter electrode 32, thereby rapidly carrying out the orientation transition.

Figure 4:
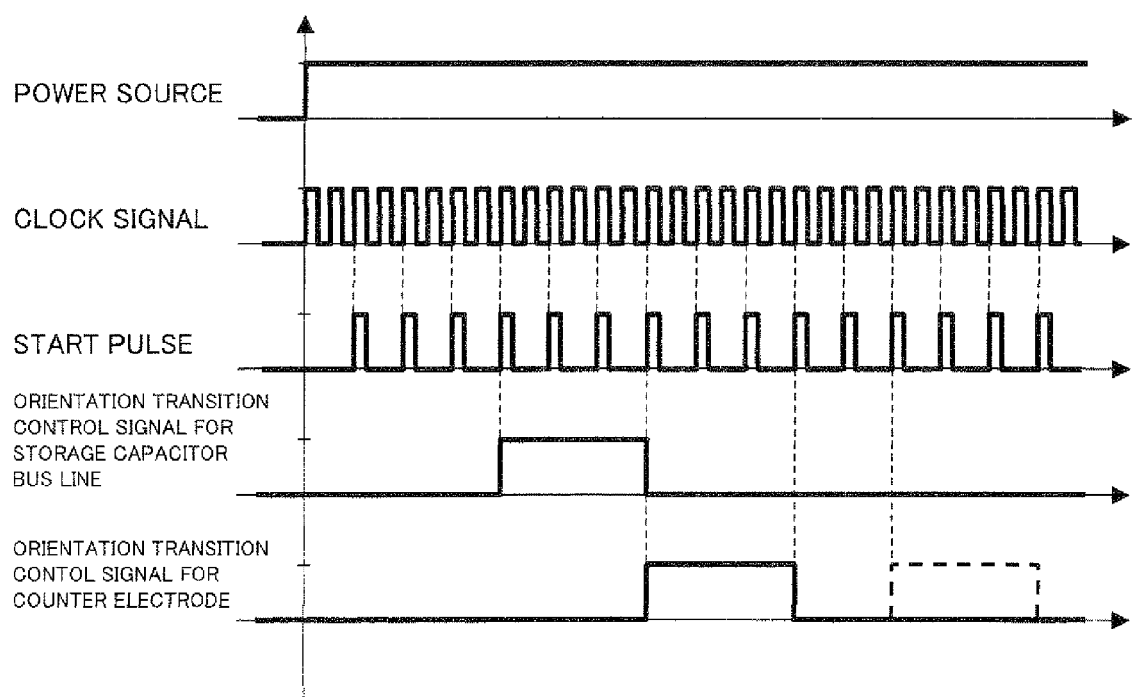
FIG. 4 is a timing diagram showing a timing of application of a transition voltage in the liquid crystal display device.

For example, as illustrated in FIGS. 3 and 4, the liquid crystal control circuit 13 first switches the relay circuit 14 by the orientation transition control signal for the storage capacitor bus line 27 so as to input 25V as the storage capacitor bus line signal into the wiring 54 for the storage capacitor bus line, thereby inputting a voltage (transition voltage) of 25V into the storage capacitor bus line 27 of the liquid crystal panel 1 via the wiring 54 for the storage capacitor bus line. Next, the relay circuit 14 is switched by the orientation transition control signal for the storage capacitor bus line 27, thereby inputting a signal outputted from the liquid crystal control circuit 13 into the wiring 54 for the storage capacitor bus line. At the same time as this, the relay circuit 14 is switched by the orientation transition control signal for the counter electrode 32 so as to input 25V as the counter electrode signal into the wiring 55 for the counter electrode signal, thereby inputting 25V into the counter electrode 32 of the liquid crystal panel 1 via the wiring 55 for the counter electrode signal. Finally, the relay circuit 14 is switched by the orientation transition control signal for the counter electrode 32 so as to input a signal outputted from the liquid crystal control circuit 13 into the wiring 55 for the counter electrode signal.

The relay circuit 14 is set such that during normal display, each of the signals outputted from the liquid crystal control circuit 13 is inputted into the wiring 54 for the storage capacitor bus line and the wiring 55 for the counter electrode signal, thereafter to be inputted into the liquid crystal panel 1.

Furthermore, in FIG. 4, when the power supply is started, the clock signal is started first, followed by generation of start pulses. The orientation transition control signal is controlled according to the frequency of the start pulses. Only when the orientation transition control signal is generated, the relay circuit 14 is switched, and consequently, as illustrated in FIG. 4, for example, an orientation transition voltage of +25V (or −25V) is applied to the storage capacitor bus line 27 and the counter electrode 32. When the orientation transition control signal is not generated, the relay circuit 14 is switched to be in the former state, the normal liquid crystal control signal generated in the liquid crystal control circuit 13 is inputted into the storage capacitor bus line 7 and the counter electrode 32 so that the storage capacitor bus line 27 and the counter electrode 32 are normally driven again.

Moreover, when the orientation transition voltage is reapplied to the counter electrode 32, the orientation transition control signal for the counter electrode is inputted as illustrated with a dotted line in FIG. 4.

Figure 5:
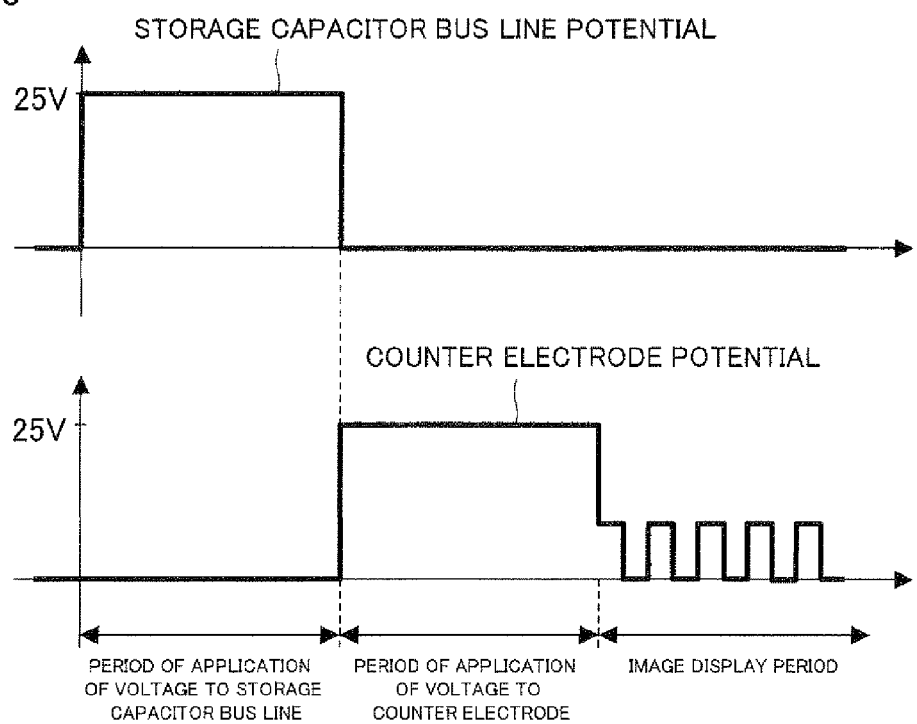
FIG. 5 is a timing diagram showing a relationship between application of a transition voltage to a storage capacitor bus line and application of a transition voltage to a counter electrode in the liquid crystal display device.

FIG. 5 is a timing diagram (waveform chart) showing a relationship between application of a transition voltage to the storage capacitor bus line and application of a transition voltage to the counter electrode in the liquid crystal display device 10.

In the present embodiment of the liquid crystal display device 10 including the drive circuit 50 configured as above, as illustrated in FIG. 5, a timing of application of a transition voltage to the storage capacitor bus line 27 and a timing of application of a transition voltage to the counter electrode 32 are different from each other. After application of the transition voltage to the storage capacitor bus line 27 and the end of the application of the transition voltage, the transition voltage is applied to the counter electrode 32.

In detail, for example, after application of the transition voltage to the storage capacitor bus line 27, the transition voltage is applied to the counter electrode 32 at the same time as the end of the application of the transition voltage to the storage capacitor bus line 27. Moreover, application of a transition voltage for transition to the storage capacitor bus line 27 continues for some time before the end of the application of the transition voltage. The end of the application of the transition voltage is not limited to a state where a voltage of the storage capacitor bus line 27 is 0V, but may be a state where the voltage of the storage capacitor bus line 27 is at a drive voltage during normal display or OPEN state. Note that OPEN means a state where a terminal connected to the storage capacitor bus line 27 is open and an electric charge of the storage capacitor bus line 27 is retained.

That is, in the liquid crystal layer 4 in the OCB mode in which the spray orientation is maintained as the initial state when the power supply is off and the spray orientation is changed to the bend orientation as an image display state when the power supply is on, the orientation of the liquid crystal molecules is changed from the initial state to the image display state by application of a transition voltage to the liquid crystal layer 4. At this time, the transition occurs from the transition nucleus. The spread of the transition makes it possible to carry out the orientation transition of the entire pixels.

In the present embodiment, the liquid crystal control circuit 13 and the relay circuit 14 apply the transition voltage to the storage capacitor bus line 27 so as to apply an electric field between the pixel electrode 24 and the storage capacitor bus line 27. This generates a transverse electric field between the storage capacitor bus line 27 and the pixel electrode 24 in the vicinity of the cutaway portion 24a. The transverse electric field can cause the liquid crystal molecules to have twist orientation. Therefore, the transition nucleus can be formed in all the pixels.

Note that the twist orientation indicates that the liquid crystal molecules are oriented in a different direction away from a direction of a plane that includes a thickness direction of the liquid crystal cell and is parallel to the rubbing direction. In cases of the spray orientation and the bend orientation, the liquid crystal molecules are oriented in the plane, and therefore are not oriented in such a different direction. For this reason, when the transverse electric field is generated between the storage capacitor bus line 27 and the pixel electrode 24 to cause the twist orientation, it is possible to easily observe (observe with the polarizer) the twist orientation, by providing the liquid crystal panel 1 with the polarizers 43 and 44 as described above.

As described above, after the twist orientation occurs in the liquid crystal molecules and the transition nucleus is formed in all the pixels, the liquid crystal control circuit 13 and the relay circuit 14 apply the transition voltage to the counter electrode 32 so as to apply the electric field between the pixel electrode 24 and the counter electrode 32 As a result, the large transition electric field is generated between the counter electrode 32 and the pixel electrode 24 and thus the formed transition nucleus can be rapidly spread to the entire pixels. This allows the liquid crystal molecules to rapidly change the orientation from the spray orientation to the bend orientation in the entire pixels. That is, as described above, when a transition voltage is applied to a part where the twist orientation occurs in such a manner that the transition voltage is applied in the thickness direction of the liquid crystal cell (i.e. between the pixel electrode 24 and the counter electrode 32), the bend orientation occurs from the part and is spread to the entire pixels.

In this way, in the present embodiment, a homopolar (homophase) voltage is not simultaneously applied to the storage capacitor bus line 27 and the counter electrode 32. Instead, a transition voltage is initially applied to the storage capacitor bus line 27, and a transition voltage is applied to the counter electrode 32 after a certain period in which liquid crystal molecules have responded, that is, with a time difference. Specifically, after application of a transition voltage to the storage capacitor bus line 27 and occurrence of the twist orientation in the liquid crystal molecules, the transition voltage is applied to the counter electrode 32. Therefore, unlike the conventional technique, the present invention is not designed such that the same homopolar transition voltage is simultaneously applied to the storage capacitor bus line 27 and the counter electrode 32 in the initial state which has a influence on formation of the transition nucleus and consequently an area to which no voltage is applied is made at the cutaway portion 24a of the pixel electrode 24.

Moreover, when the transition nucleus is formed, a transition voltage is first applied only to the storage capacitor bus line 27 but not to the counter electrode 32 in the initial state. Therefore, a high voltage derived from adding a voltage of the storage capacitor bus line 27 and a voltage of the counter electrode 32 together is unnecessary. The transition nucleus is thus formed at a low voltage.

As a result, when the OCB mode is applied, it is possible to provide a liquid crystal display device which allows rapidly forming the transition nucleus at a low voltage in all the pixels and thus rapidly carrying out the transition from spray to bend.

Furthermore, also at a low temperature where the viscosity of the liquid crystal increases, it is possible to change the orientation of the entire screen to the bend orientation.

Here, in the liquid crystal display device 10 of the present embodiment, after the end of application of the transition voltage to the storage capacitor bus line 27, the transition voltage to the counter electrode 32 is applied. In this case, it is preferable to apply the transition voltage to the counter electrode 32 at the same time as the end of application of the transition voltage to the storage capacitor bus line 27 as described above, or with a short interval when the orientation of the liquid crystal molecules do not return to the spray orientation which is the initial state (initial orientation). This makes it possible to carry out the transition from spray to bend more rapidly at a lower voltage in all the pixels.

The following discusses a timing and an application time for applying the transition voltage to the counter electrode 32 after the end of application of the transition voltage to the storage capacitor bus line 27.

That is, the timing of application of the transition voltage to the counter electrode 32 is calculated with reference to a time for relaxation of the liquid crystal molecules. In other words, when the voltage to the counter electrode 32 is applied after the end of application of the transition voltage to the storage capacitor bus line 27, it is not effective if the liquid crystal molecules return to the initial state (a state before the transition voltage is applied to the storage capacitor bus line 27). In view of this, the timing of application of the transition voltage to the counter electrode 32 needs to be 4 m seconds or less because the response time for the orientation change from the time of the black display to the time of the white display in "the OCB mode at the room temperature" in which the response time is shortest is 4 to 5 m seconds. Moreover, a movement of the liquid crystal molecules returning to the initial state (initial orientation) is the orientation change from the twist orientation to non-twist orientation, and therefore requires a longer time as compared with the response time for the orientation change from the time of the black display to the time of the white display.

However, since the response time for the orientation change from the time of the black display to the time of the white display in the OCB mode is 100 m to 200 m seconds at −30° C., the time for application of the transition voltage to the counter electrode 32 is 4 m seconds at minimum and 100 seconds at maximum when the time for the orientation change is considered to be controllable according to a temperature by setting a temperature sensor.

Therefore, the best order of the timing of application of the transition voltage to storage capacitor bus line 27 and to the counter electrode 32 is as follows:

(1) After application of the transition voltage to the storage capacitor bus line 27 is stopped, the transition voltage to the counter electrode 32 is applied.

(2) At the same time as application of the transition voltage to the storage capacitor bus line 27 is stopped, the transition voltage to the counter electrode 32 is applied.

(3) Before application of the transition voltage to the storage capacitor bus line 27 is stopped, the transition voltage to the counter electrode 32 is applied. (to be explained in [Second embodiment] described later)

This is because it is considered more preferable that a potential of the storage capacitor bus line 27 be rapidly returned to a normal drive potential after the start of application of the transition voltage (that is, a special waveform voltage higher than and different from a normal drive voltage) to the counter electrode 32 so that the bend orientation having occurred at the bend transition nucleus is spread to the entire pixels.

Next, the following discusses the application time when the transition voltage to the counter electrode 32 is applied.

That is, the transition voltage to the counter electrode 32 is applied until the transition is completely ended. Ideally, it is necessary to apply the transition voltage over a time which is calculated by dividing a distance between an edge of a pixel and a transition nucleus by a transition speed so as to completely end the transition. With a liquid crystal material used this time, the transition is ended in 0.75 second which is calculated by dividing 150 μm by 200 μm per second at −30°

C. However, an obstacle, such as a spacer or the like in the pixel hinders the transition from being spread. Therefore, in view of a margin, it seems preferable that twice or so longer time be secured.

Furthermore, in the liquid crystal display device 10 of the present embodiment, when the transition voltage is applied to the counter electrode 32, it is possible to apply the transition voltage with the transition voltage changed with time. That is, the transition voltage to be applied to the counter electrode 32 may be unchanged, but it is also possible to intentionally change the voltage with time. The orientation transition is easy to be spread to the entire pixels by repeating application of the transition voltage (ON) and the end of application of the transition voltage (OFF) by the 0.5 second, for example, that is, by repeating: turning ON the power supply and turning OFF the power supply; application of the transition voltage and application of the normal drive voltage; or application of the transition voltage and the OPEN state, for example.

That is, it is preferable that after application of the transition voltage to the counter electrode 32 for a time in which the transition is ideally ended, the transition voltage to the counter electrode 32 be intentionally changed so as to promote the transition to be spread to a place where the transition is hindered from being spread by the obstacle, such as a spacer or the like.

For example, Patent Literature 6 discloses that hindrance of the transition of the liquid crystal molecules is caused because the liquid crystal molecules are oriented asymmetrically at upper and lower parts. In view of this, the transition voltage to the counter electrode 32 is once returned to 0 and the asymmetric orientation of liquid crystal molecules having the spray orientation in an area where the bend transition does not occur is returned to the uniform spray orientation so as to cause the bend orientation to occur again. Specifically, a period during which the transition voltage to the counter electrode 32 is returned to 0 is calculated with reference to a relaxation time when the transition voltage to the counter electrode 32 is turned from ON to OFF. In view of a case where the relaxation time is shortest, it is considered preferable that the period during which the transition voltage to the counter electrode 32 is returned to 0 be 4 m seconds or more because the response time for the orientation change from the time of the black display to the time of the white display in the OCB mode at the room temperature is 4 to 5 m seconds. On the other hand, in view of a case where the relaxation time is longest, it is preferable that the period during which the transition voltage to the counter electrode 32 is returned to 0 be 2 seconds or less because the response time for the orientation change from the time of the black display to the time of the white display in a general liquid crystal mode at −30° C. is 1 to 2 seconds. Therefore, in the liquid crystal display device 10 of the present embodiment, it is preferable that the period during which the transition voltage to the counter electrode 32 is returned to 0 be 4 m seconds or more and 2 seconds or less.

Moreover, in the liquid crystal display device 10 of the present embodiment, it is preferable that the pixel electrode 24 be a transparent electrode. According to this, when the OCB mode is applied in a transmission-type liquid crystal display device 10, it is possible to provide the liquid crystal display device 10 which allows rapidly forming the transition nucleus at a low voltage in all the pixels and thus rapidly carrying out the transition from spray to bend.

Embodiment 2

Another embodiment of the present invention is described below with reference to FIG. 6. Furthermore, a configuration other than what is described in the present embodiment is the same as the configuration of the first embodiment. Moreover, for convenience of explanation, members having the same functions as those shown in the first embodiment are given the same reference numerals and explanations thereof are omitted here.

The liquid crystal display device 10 of the present embodiment is different from the first embodiment in the timing of application of the transition voltage to the storage capacitor bus line 27 and application of the transition voltage to the counter electrode 32.

That is, in the present embodiment, as illustrated in FIG. 3, the liquid crystal control circuit 13 first switches the relay circuit 14 by the orientation transition control signal for the storage capacitor bus line 27 so as to input 25V as the storage capacitor bus line signal into the wiring 54 for the storage capacitor bus line, thereby inputting a voltage (transition voltage) of 25V into the storage capacitor bus line 27 of the liquid crystal panel 1 via the wiring 54 for the storage capacitor bus line. Next, the relay circuit 14 is switched by the orientation transition control signal for the counter electrode 32 so as to input 25V as the counter electrode signal into the wiring 55 for the counter electrode signal, thereby inputting 25V into the counter electrode 32 of the liquid crystal panel 1 via the wiring 55 for the counter electrode signal. Thereafter, the relay circuit 14 is switched by the orientation transition control signal for the storage capacitor bus line, thereby inputting a signal outputted from the liquid crystal control circuit 13 into the wiring 54 for the storage capacitor bus line. Finally, the relay circuit 14 is switched by the orientation transition control signal for the counter electrode 32 so as to input a signal outputted from the liquid crystal control circuit 13 into the wiring 55 for the counter electrode signal.

The relay circuit 14 is set such that during normal display, each of the signals outputted from the liquid crystal control circuit 13 is inputted into the wiring 54 for the storage capacitor bus line and the wiring 55 for the counter electrode signal, thereafter to be inputted into the liquid crystal panel 1.

An operation of the drive circuit is specifically described with reference to a timing diagram shown in FIG. 6.

Figure 6:
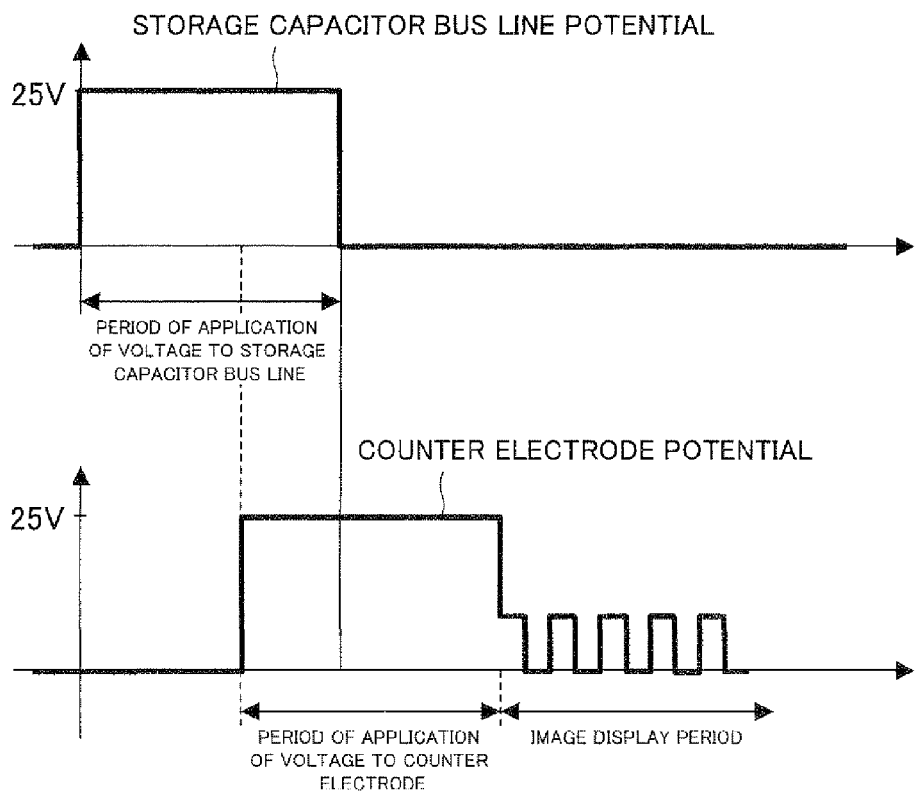
FIG. 6 is a timing diagram showing a relationship between application of the transition voltage to the storage capacitor bus line and application of the transition voltage to the counter electrode in a liquid crystal display device according to another embodiment of the present invention.
Figure 7:
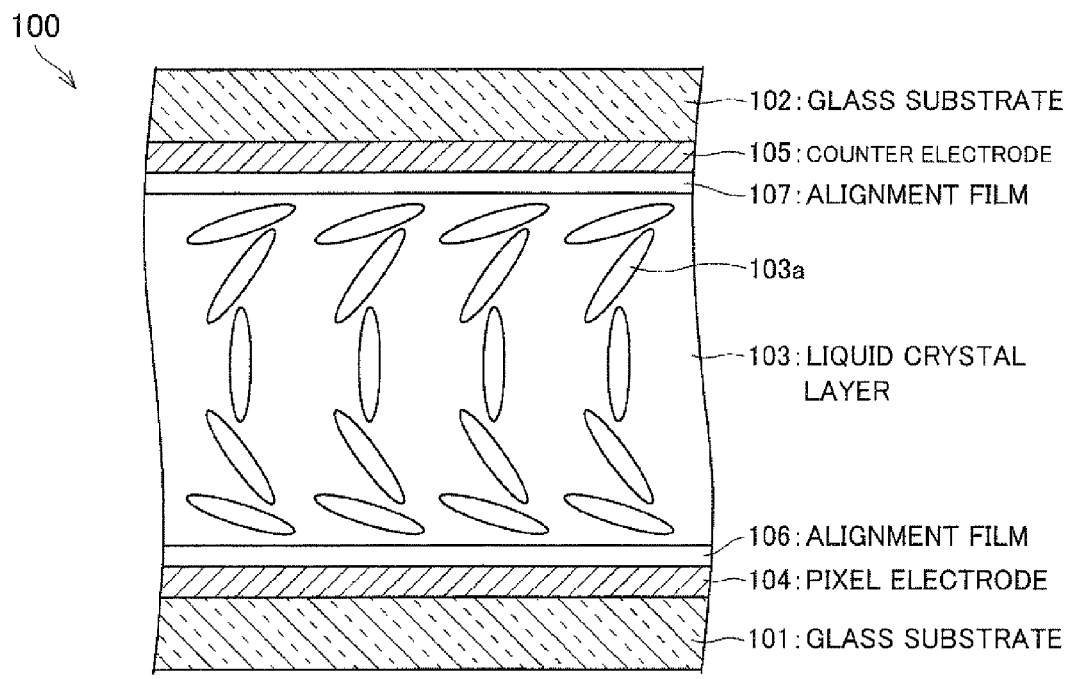
FIG. 7 is a cross-sectional view of a liquid crystal panel to which the OCB mode is applied, showing a state of liquid crystal molecules having bend orientation in a liquid crystal layer when a voltage is applied.
Figure 8:
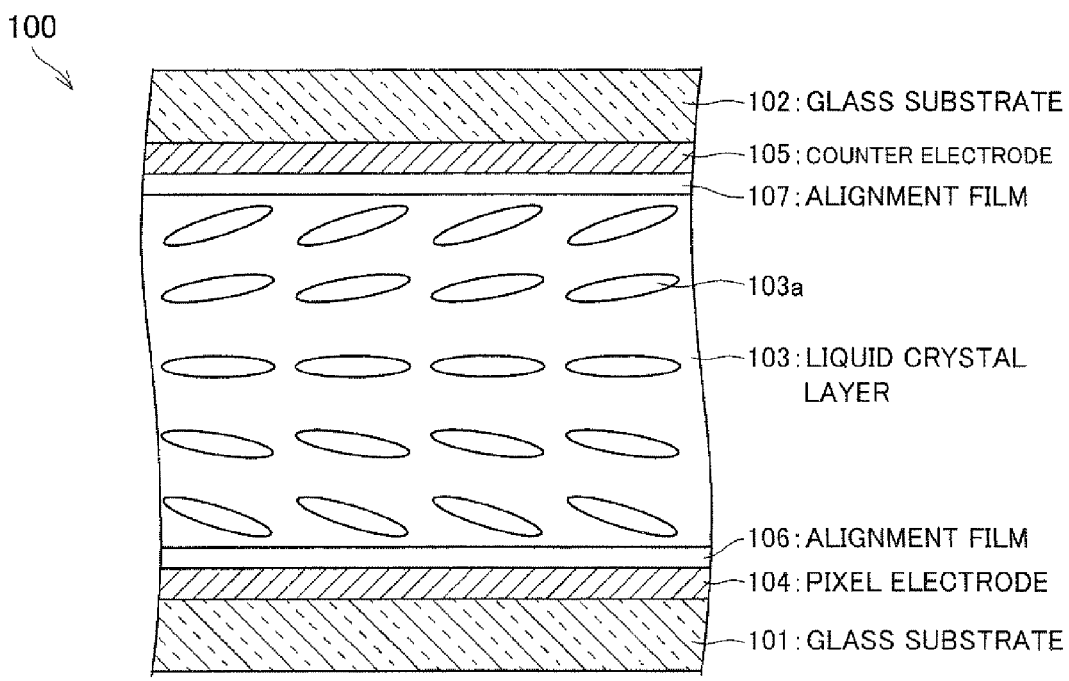
FIG. 8 is a cross-sectional view of the liquid crystal panel to which the OCB mode is applied, showing a state of the liquid crystal molecules having spray orientation in the liquid crystal layer when no voltage is applied.
Figure 9:
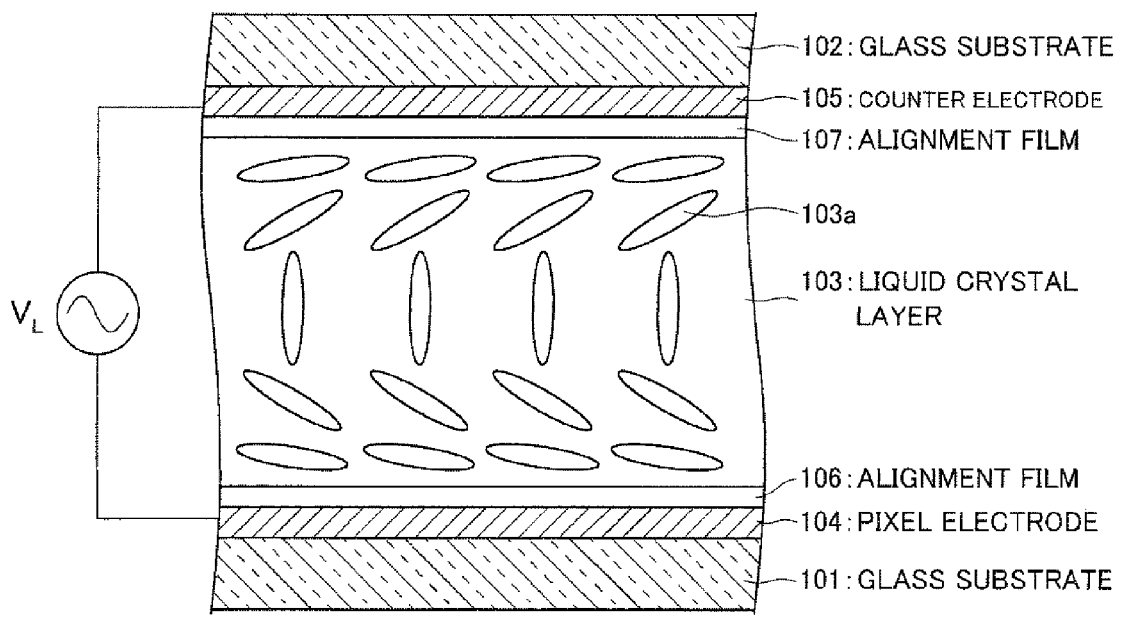
FIG. 9 is a cross-sectional view of the liquid crystal panel to which the OCB mode is applied, showing a state of the liquid crystal molecules having the bend orientation in the liquid crystal layer when a low voltage is applied (when a white display is performed).
Figure 10:
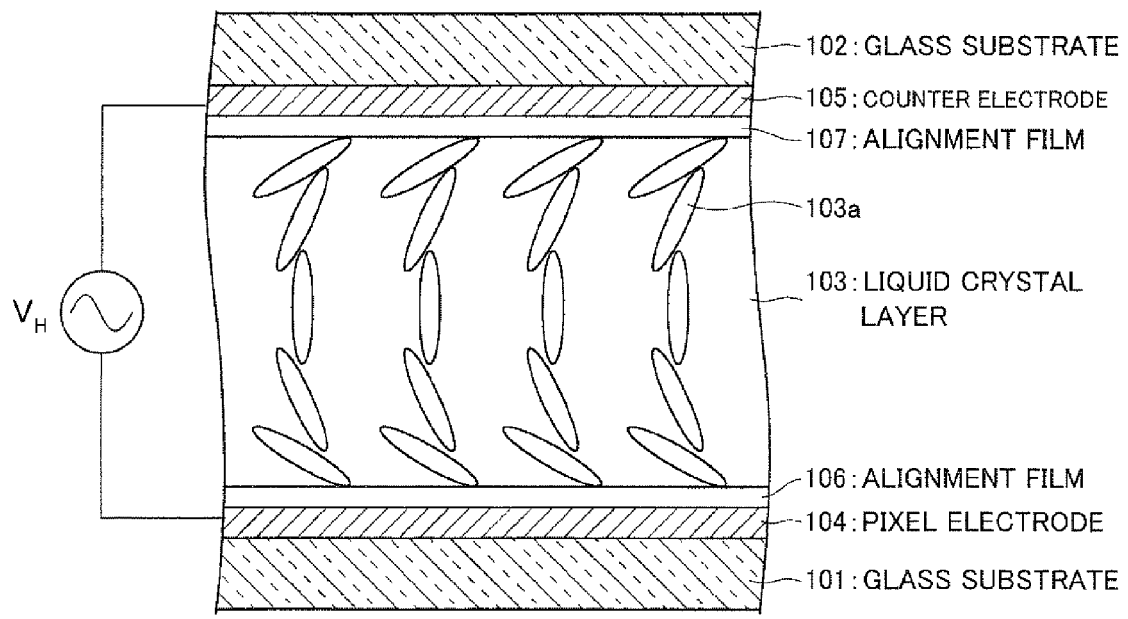
FIG. 10 is a cross-sectional view of the liquid crystal panel to which the OCB mode is applied, showing a state of the liquid crystal molecules having the bend orientation in the liquid crystal layer when a high voltage is applied (when a black display is performed).
Figure 11:
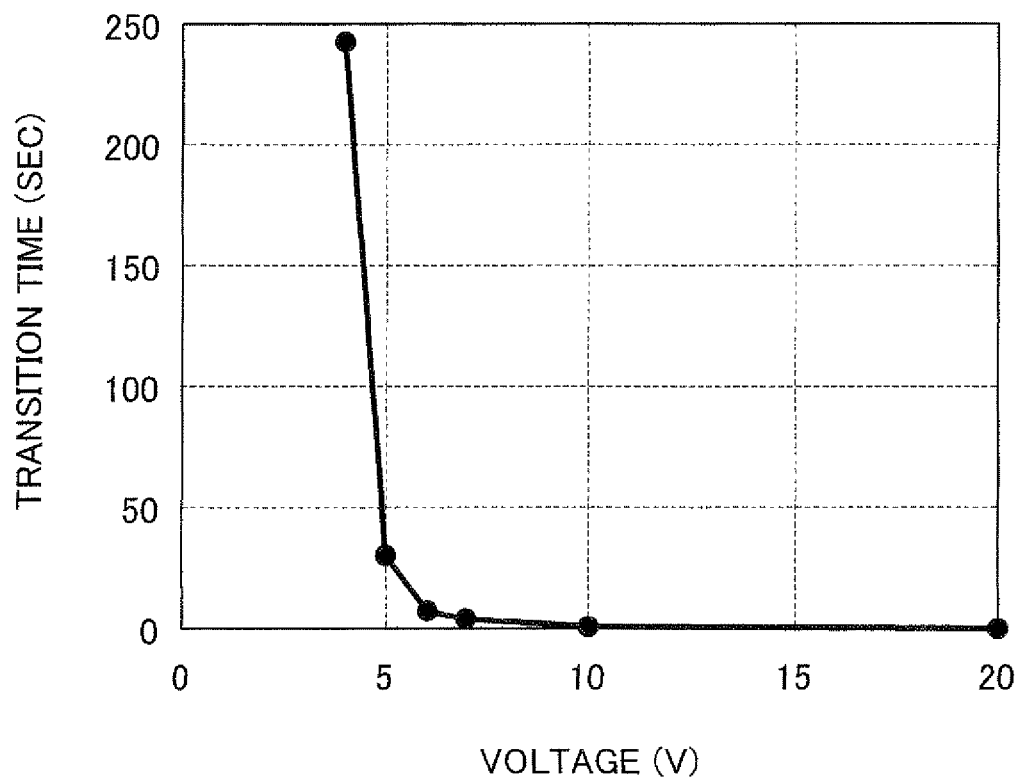
FIG. 11 is a graph showing a relationship between a voltage applied to the liquid crystal layer at a room temperature (+25° C.) and a transition time required for a transition from spray to bend.
Figure 12:
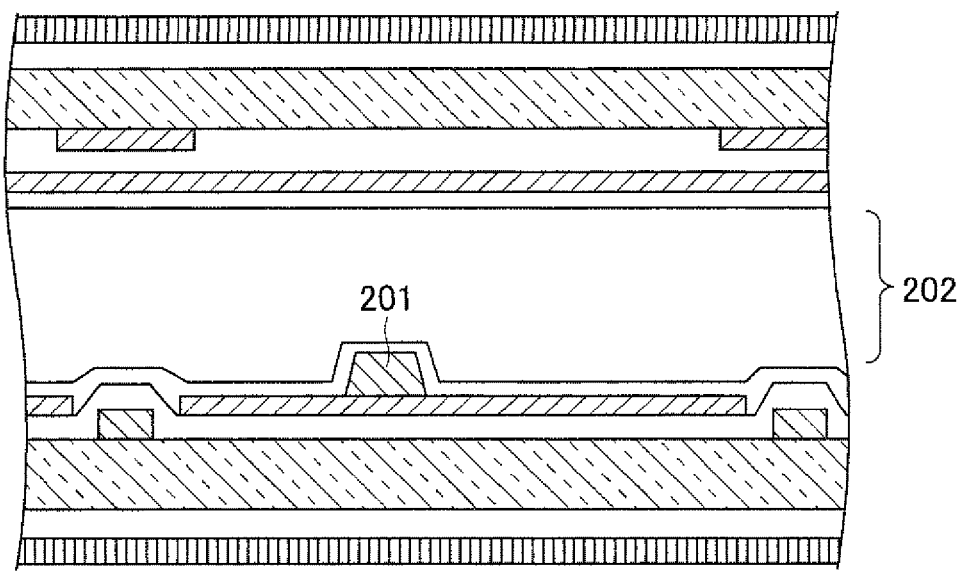
FIG. 12 is a cross-sectional view showing a configuration of a liquid crystal panel in a conventional liquid crystal display device, including a protrusion for promoting formation of transition nucleus.
Figure 13:
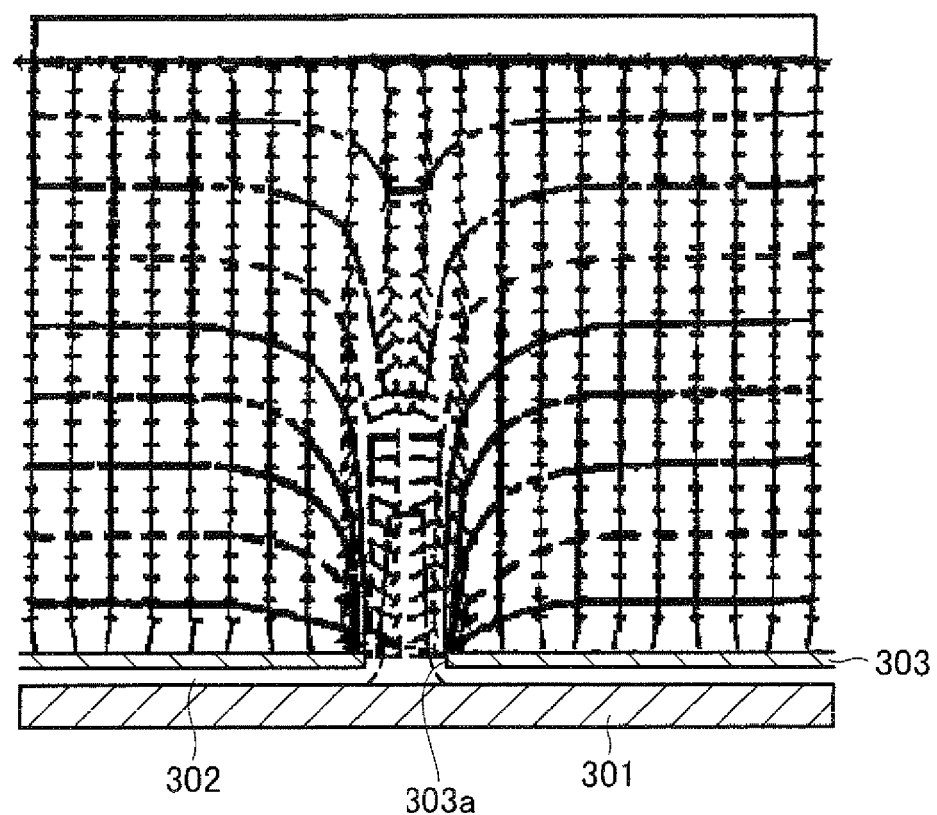
FIG. 13 is a cross-sectional view showing a configuration of a liquid crystal panel in another conventional liquid crystal display device, including an opening at a pixel electrode so as to promote formation of the transition nucleus.

FIG. 6 is a timing diagram showing a relationship between application of the transition voltage to the storage capacitor bus line and application of the transition voltage to the counter electrode in the liquid crystal display device 10 of the present embodiment.

As shown in FIG. 6, in the present embodiment, the liquid crystal display circuit 13 and the relay circuit 14 as the transition voltage application section (transition voltage application means), after application of the transition voltage to the storage capacitor bus line 27, apply the transition voltage to the counter electrode 32 just before the end of application of the transition voltage to the storage capacitor bus line 27. Thereafter, the liquid crystal display circuit 13 and the relay circuit 14, just after application of the transition voltage to the counter electrode 32, ends application of the transition voltage to the storage capacitor bus line 27.

This is because temporarily homologizing the voltage to the storage capacitor bus line 27 and the voltage to the counter electrode 32 is considered to be effective in spreading the transition having once occurred from the transition nucleus to the pixel area.

Furthermore, in the present embodiment, it is possible to rapidly spread the transition to the entire pixels because after application of the transition voltage to the counter electrode 32, application of the transition voltage to the storage capacitor bus line 27 is ended so as to apply the transition voltage only to the counter electrode 32.

The following discusses the timing of application of the transition voltage to the counter electrode 32.

That is, as for the timing of application of the transition voltage to the counter electrode 32, it seems necessary to apply the transition voltage to the counter electrode 32 after the transition voltage is applied to the storage capacitor bus line 27 and thereby the liquid crystal molecules respond (the twist orientation occurs in the liquid crystal molecules) even a little (or sufficiently). In this case, provided that an operation is carried out at a low temperature, at −30° C., for example, the viscosity of the liquid crystal molecules is high and it takes a long time for the liquid crystal molecules to respond after application of the transition voltage to the storage capacitor bus line 27. At −30° C., in the general liquid crystal mode (TN mode, ECB mode, and the like), time required for change in the orientation (orientation direction) of the liquid crystal molecules (i.e. time required for change from the black display to the white display or vice versa) is 500 m seconds (0.5 second) when a voltage is applied to the liquid crystal molecules. (Precisely, a time for change in luminance from 90% to 10% is measured.) Then on average, 0.5 second in which the liquid crystal sufficiently responds (the orientation of the liquid crystal molecules is changed) is considered as a proper timing of application of the transition voltage to the counter electrode 32 after application of the transition voltage to the storage capacitor bus line 27.

On the other hand, at the room temperature, in the general liquid crystal mode, the time required for change in the orientation (orientation direction) of the liquid crystal molecules is several m seconds. However, in the OCB mode, the orientation (orientation state) of the liquid crystal molecules is changed (from the black display to the white display) much more rapidly, in 0.2 to 0.3 m seconds. Therefore, at the room temperature, it seems effective when the timing of application of the voltage is 0.2 m second or more after the liquid crystal molecules respond (that is, the orientation is changed from the non-twist orientation to the twist orientation). Consequently, as for the timing of application of the transition voltage to the counter electrode 32 after application of the transition voltage to the storage capacitor bus line 27, it can be said that the minimum timing is 0.2 m second, the standard timing is 0.5 second, and there is no upper limit.

Here, the response time (from the black display to white display) is: shorter in "OCB mode" than in "general liquid crystal mode"; shorter in "room temperature" than in "low temperature". That is, the response time is shortest in "OCB mode at the room temperature" and longest in "general liquid crystal mode at a low temperature". The orientation in the OCB mode during non-display (non-drive or non-transition) is the spray orientation and the response therein is made in the same manner as the general liquid crystal mode. The "minimum" timing corresponds to the timing when the liquid crystal molecules respond (the twist orientation occurs) even a little. The "standard" timing corresponds to the timing when the liquid crystal responds (the twist orientation occurs) sufficiently.

One example of a method of driving the liquid crystal display device 10 according to the first and second embodiments, that is, a method of driving the liquid crystal panel 1 in the liquid crystal display device 10 is individually described below more specifically with reference to examples. Note that the present invention is not limited only to the examples below.

Example 1

Described is a result of observation of a display when the transition voltage shown in FIG. 5 was applied to the storage capacitor bus line 27 and the counter electrode 32 in the liquid crystal display device 10 of the foregoing configuration.

As shown in FIG. 5, as the transition voltage, +25V was individually applied for 1 second. That is, the transition voltage of +25V was first applied to the storage capacitor bus line 27 for 1 second only, while the counter electrode 32 was driven to perform normal display. After 1 second, the voltage to the storage capacitor bus line 27 was changed to a drive voltage to perform normal display. At the same time as this, the transition voltage of +25V is applied to the counter electrode 32 for 1 second only, and then the transition voltage to the counter electrode 32 is changed to a drive voltage to perform normal display, and the display was checked. Moreover, it was confirmed that the spray orientation occurred in the initial state with no voltage applied.

When such a voltage was applied at the room temperature, the bend orientation occurred in all the pixels. This shows that the transition from spray to bend was carried out in all the pixels in the entire screen.

In the liquid crystal panel 1, due to the bend orientation occurring in the entire screen, a black state was observed also from a diagonal direction in combination with the viewing angle compensation wave plate. This made it possible to increase the viewing angle. Furthermore, it was confirmed that even if the voltage was swiftly switched between ON and OFF, the response (from the black display to the white display) was rapidly made in several m seconds or less. Here, ON and OFF indicate a time when the voltage is relatively high ($V_H$) and a time when the voltage is relatively low ($V_L$), respectively. ON and OFF correspond to the black display and the white display, respectively. Here, 8V and 2V were designated as ON and OFF, respectively.

Next, an observation was carried out at a low temperature of −30° C.

The initial state was left enough as it was with no voltage applied so that the spray orientation occurred. Also at −30° C., after application of the same voltage as the voltage at the room temperature, the voltage was changed to a drive voltage to perform normal display so as to check the display. As a result, it was confirmed that the bend orientation occurred in all the pixels.

This shows that the transition from spray to bend was carried out in all the pixels in the entire screen even at the temperature of as low as −30° C. Similarly to the case at the room temperature, the black state was observed also from a diagonal direction in combination with the visual angle compensation wave plate. This made it possible to increase the viewing angle.

Furthermore, it was confirmed when the voltage was swiftly switched between ON and OFF, the response (from the black display to the white display) was made in several hundred m seconds or less. This may be because the response time was much longer as compared with the response time at the room temperature due to the higher viscosity as compared with the viscosity at the room temperature. However, it was confirmed that the bend orientation occurred because the response (from the black display to the white display) was made much more rapidly as compared with the response in other modes (TN (twisted nematic) mode and ECB (Electrically Controlled Birefringence) mode) in which the nematic liquid crystal was used.

For comparison, after application of +25V as the transition voltage simultaneously to the storage capacitor bus line 27 and the counter electrode 32 for 2 seconds, the display was checked. Moreover, it was confirmed that the spray orientation occurred in the initial state with no voltage applied.

As a result, when the voltage was applied at −30° C., the transition from spray to bend was carried out in almost all the pixels. However, in some of the pixels, the pixels whose orientation was not changed to the bend orientation were left and observed as bright spots when seen from a diagonal direction due to a difference in retardation. Such pixels whose orientation was not changed to the bend orientation remained while display was being performed, and the orientation thereof was not changed to the bend orientation.

For comparison, after application of +25V as the transition voltage only to the counter electrode 32 for 2 seconds, the display was checked. It was confirmed that the spray orientation occurred in the initial state with no voltage applied.

As a result, when the voltage was applied at −30° C., the bend orientation occurred in almost all the pixels. However, in some of the pixels, the pixels whose orientation was not changed to the bend orientation were left and observed as bright spots when seen from a diagonal direction due to a difference in retardation. Such pixels whose orientation was not changed to the bend orientation remained while display was being performed, and the orientation thereof was not changed to the bend orientation.

The above shows that the transition from spray to bend was carried out more rapidly at a lower voltage in all the pixels by first applying the transition voltage only to the storage capacitor bus line 27 and applying the transition voltage to the counter electrode 32 after a while at the same time as the stop of application of the transition voltage to the storage capacitor bus line 27.

Example 2

Next, the same experiment as Example 1 was carried out with the use of alignment films different from the alignment films 26 and 33 of Example 1. The alignment films were produced according to the same method as Example 1. A pretilt angle of these alignment films 26 and 33 was approximately 6°. A display was observed when the transition voltage shown in FIG. 5 was applied to the storage capacitor bus line 27 and the counter electrode 32 in the liquid crystal display device 10 of the same configuration as Example 1. As the transition voltage, +25V was individually applied for 1 second. That is, the transition voltage of +25V was first applied to the storage capacitor bus line 27 for 1 second only, while the counter electrode 32 was driven to perform normal display. After 1 second, the voltage to the storage capacitor bus line 27 was changed to a drive voltage to perform normal display. At the same time as this, the transition voltage of +25V is applied to the counter electrode 32 for 1 second only, and then the transition voltage to the counter electrode 32 is changed to a drive voltage to perform normal display, and the display was checked. Moreover, it was confirmed that the spray orientation occurred in the initial state with no voltage applied.

As a result, when such a voltage was applied at the room temperature, the bend orientation occurred in all the pixels. This shows that the transition from spray to bend was carried out in all the pixels in the entire screen.

In the liquid crystal panel 1, due to the bend orientation occurring in the entire screen, a black state was observed also from a diagonal direction in combination with the viewing angle compensation wave plate. This made it possible to increase the viewing angle. Furthermore, it was confirmed that even if the voltage was swiftly switched between ON and OFF, the response (from the black display to the white display) was rapidly made in several m seconds or less. Here, ON and OFF indicate a time when the voltage is relatively high ($V_H$) and a time when the voltage is relatively low ($V_L$), respectively. ON and OFF correspond to the black display and the white display, respectively. Here, 8V and 2V were designated as ON and OFF, respectively.

Next, an observation was carried out at a low temperature of −30° C. The initial state was left enough as it was with no voltage applied so that the spray orientation occurred. Also at −30° C., after application of the same voltage as the voltage at the room temperature, the voltage was changed to a drive voltage to perform normal display so as to check the display.

As a result, in some of the pixels, the pixels whose orientation was not changed to the bend orientation were left and observed as bright spots when seen from a diagonal direction due to a difference in retardation. Such pixels whose orientation was not changed to the bend orientation remained while display was being performed, and the orientation thereof was not changed to the bend orientation.

Then the display was observed when the transition voltage shown in FIG. 6 was applied to the storage capacitor bus line 27 and the counter electrode 32 in the liquid crystal display device 10 of the same configuration as above. +25V as the transition voltage was individually applied for 1 second. That is, the transition voltage of +25V was first applied to the storage capacitor bus line 27, while the counter electrode 32 was driven to perform normal display.

In the middle of application of the voltage to the storage capacitor bus line 27 (here, after 0.5 second), the transition voltage of +25V was applied to the counter electrode 32. After 1 second from the start of application of the voltage to the storage capacitor bus line 27, the voltage to the storage capacitor bus line 27 was changed to the drive voltage to perform normal display.

Furthermore, after 1 second from the start of application of the voltage to the counter electrode 32, the voltage to the counter electrode 32 was changed to the drive voltage to perform normal display so as to check the display. Moreover, it was confirmed that the spray orientation occurred in the initial state with no voltage applied.

As a result, it was confirmed that the bend orientation occurred in all the pixels. This shows that the transition from spray to bend was carried out in all the pixels in the entire screen even at the temperature of as low as −30° C. Similarly to the case at the room temperature, the black state was observed also from a diagonal direction in combination with the visual angle compensation wave plate. This made it possible to increase the viewing angle. Furthermore, it was confirmed when the voltage was swiftly switched between ON and OFF, the response (from the black display to the white display) was made in several hundred m seconds or less.

The above shows that the transition from spray to bend was carried out more rapidly at a lower voltage in all the pixels by first applying the transition voltage only to the storage capacitor bus line 27, applying the transition voltage to the counter electrode 32 in the middle of application of the transition voltage to the storage capacitor bus line 27, and stopping the application of the transition voltage to the storage capacitor bus line 27 in the middle of application of the transition voltage to the counter electrode 32.

As described above, the liquid crystal display device and the liquid crystal panel drive device for driving the liquid crystal panel according to the first and second embodiments include: an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied; the liquid crystal display device and the device for driving the liquid crystal panel further including: a storage capacitor bus line provided on the pixel electrode so as to be opposite to the counter substrate with an insulating film between the storage capacitor bus line and the pixel electrode; an opening provided at a part of the pixel electrode at a region where the pixel electrode and the storage capacitor bus line intersect; and a transition voltage application section (transition voltage application means) provided for applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

That is, the liquid crystal display device and the liquid crystal panel drive device for driving the liquid crystal panel include: the active matrix substrate including the pixel electrode; and the counter substrate including the counter electrode, the active matrix substrate and the counter substrate being provided with the liquid crystal layer therebetween; the storage capacitor bus line provided on the pixel electrode so as to be opposite to the counter substrate with the insulating film between the storage capacitor bus line and the pixel electrode; the opening provided at a part of the pixel electrode at the region where the pixel electrode and the storage capacitor bus line intersect; and the transition voltage application section (transition voltage application means) for applying the transition voltage to the storage capacitor bus line and the counter electrode for changing the orientation of the liquid crystal molecules in the liquid crystal layer from the spray orientation to the bend orientation, the transition voltage application section applying the transition voltage to the counter electrode after application of the transition voltage to the storage capacitor bus line.

More specifically, the transition voltage application section applies the transition voltage to the storage capacitor bus line so as to apply an electric field between the pixel electrode and the storage capacitor bus line and after a certain period in which the liquid crystal molecules have responded, that is, after occurrence of twist orientation at the opening, the transition voltage application section applies the transition voltage to the counter electrode so as to apply an electric field between the pixel electrode and the counter electrode.

Furthermore, the drive method for driving a liquid crystal display device and the liquid crystal panel drive method for driving a liquid crystal panel according to the first and second embodiments are methods for driving a liquid crystal display device and a liquid crystal panel each including: an active matrix substrate including a pixel electrode and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied; the liquid crystal display device and the liquid crystal panel further including a storage capacitor bus line provided on the pixel electrode so as to be opposite to the counter substrate with an insulating film between the storage capacitor bus line and the pixel electrode; and an opening provided at a part of the pixel electrode at a region where the pixel electrode and the storage capacitor bus line intersect.

That is, the drive method for driving a liquid crystal display device and the liquid crystal panel drive method for driving a liquid crystal panel are the methods for driving the liquid crystal display device and the liquid crystal panel each including: the active matrix substrate including the pixel electrode; and a counter substrate including a counter electrode, the active matrix substrate and the counter substrate being provided to be opposed to each other with the liquid crystal layer therebetween; the liquid crystal display device and the liquid crystal panel further including the storage capacitor bus line provided on the pixel electrode so as to be opposite to the counter substrate with an insulating film between the storage capacitor bus line and the pixel electrode; and the opening provided at a part of the pixel electrode at the region where the pixel electrode and the storage capacitor bus line intersect, the liquid crystal display device and the liquid crystal panel being driven in the OCB mode in which the orientation of the liquid crystal molecules in the liquid crystal layer is spray orientation when no voltage is applied and the orientation is changed to the bend orientation when a voltage is applied.

The method for driving the liquid crystal display device and the liquid crystal panel drive method for driving the liquid crystal panel include applying the transition voltage to the storage capacitor bus line so as to apply an electric field between the pixel electrode and the storage capacitor bus line and thereafter (more specifically, after occurrence of the twist orientation at the opening by application of the transition voltage to the storage capacitor bus line), applying the transition voltage to the counter electrode so as to apply an electric field between the pixel electrode and the counter electrode.

Therefore, with each of the foregoing configurations, when the OCB mode is applied, it is possible to provide a liquid crystal display device, a method for the same, and a device and a method for driving a liquid crystal panel, each of which allows rapidly forming the transition nucleus at a low voltage in all the pixels and thus rapidly carrying out the transition from spray to bend.

It is preferable to arrange the liquid crystal display device so that the transition voltage application section applies the transition voltage to the counter electrode after application of the transition voltage to the storage capacitor bus line and further after the end of the application of the transition voltage to the storage capacitor bus line. Note that, in the storage capacitor bus line, after a while from application of the transition voltage for transition, the application of the transition voltage is ended. Such a state where the application of the transition voltage is ended is not limited to a state where a voltage of the storage capacitor bus line is 0V, but may be a state where the voltage is a drive voltage during normal display or the OPEN state.

Consequently, a high voltage derived from adding a voltage of the storage capacitor bus line and a voltage of the counter electrode is unnecessary without fail.

Furthermore, it is preferable to arrange the liquid crystal display device so that the transition voltage application section applies a transition voltage to the counter electrode after application of a transition voltage to the storage capacitor bus line and at the same time as the end of the application of the transition voltage to the storage capacitor bus line.

This makes it possible to carry out the transition from spray to bend more rapidly at a lower voltage in all the pixels.

Moreover, it is preferable to arrange the liquid crystal display device so that the transition voltage application section applies a transition voltage to the counter electrode after application of a transition voltage to the storage capacitor bus line and just before the end of the application of the transition voltage to the storage capacitor bus line.

That is, it is preferable to apply the transition voltage to the counter electrode just before the end of the application of the transition voltage to the storage capacitor bus line and to end the application of the transition voltage to the storage capacitor bus line just after the application of the transition voltage to the counter electrode.

This is because temporarily homologizing the voltage of the storage capacitor bus line and the voltage of the counter electrode seems to be effective in spreading the transition having once occurred from the transition nucleus to the pixel area.

Furthermore, in the liquid crystal display device, it is possible to spread the transition to the entire pixels because after application of the transition voltage to the counter electrode, application of the transition voltage to the storage capacitor bus line is stopped so as to apply the transition voltage only to the counter electrode.

Moreover, it is preferable to arrange the liquid crystal display device so that the transition voltage application section applies the transition voltage to the counter electrode while changing the transition voltage with time.

That is, the transition voltage to be applied to the counter electrode may be unchanged, but it is also possible to intentionally change the voltage. The orientation transition is easy to be spread to the entire pixels by repeating ON and OFF by the 0.5 second, for example.

Furthermore, in the liquid crystal display device, it is preferable to apply the transition voltage to the storage capacitor bus line and the counter electrode, the transition voltage being homopolar, more preferably, homopolar and identical. Consequently, a high voltage derived from adding a voltage of the storage capacitor bus line and a voltage of the counter electrode is unnecessary without fail.

Moreover, it is preferable to arrange the liquid crystal display device so that the pixel electrode is a transparent electrode.

With the arrangement, when the OCB mode is applied in a transmission-type liquid crystal display device, it is possible to provide the liquid crystal display device which allows rapidly forming the transition nucleus at a low voltage in all the pixels and thus rapidly carrying out the transition from spray to bend.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The invention is applicable to a liquid crystal display device, and a device and a method for driving a liquid crystal panel, to each of which the OCB (Optically self-Compensated Birefringence) mode is applied. Furthermore, a type of the liquid crystal display device may be a transmission type, a semi-transmission type or a reflection type.

The invention claimed is:
1. A liquid crystal display device, including:
an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied, the liquid crystal display device comprising:
a storage capacitor bus line provided on the pixel electrode so as to be opposite to the counter substrate with an insulating film between the storage capacitor bus line and the pixel electrode;
an opening provided at a part of the pixel electrode at a region where the pixel electrode and the storage capacitor bus line intersect; and a transition voltage application section provided for applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

2. The liquid crystal display device as set forth in claim 1, wherein
the transition voltage application section applies the transition voltage to the counter electrode after application of the transition voltage to the storage capacitor bus line and occurrence of twist orientation at the opening.

3. The liquid crystal display device as set forth in claim 1, wherein
the transition voltage application section applies the transition voltage to the counter electrode after application of the transition voltage to the storage capacitor bus line and further after an end of the application of the transition voltage to the storage capacitor bus line.

4. The liquid crystal display device as set forth in claim 1, wherein
the transition voltage application section applies the transition voltage to the counter electrode after application of the transition voltage to the storage capacitor bus line and at a same time as an end of the application of the transition voltage to the storage capacitor bus line.

5. The liquid crystal display device as set forth in claim 1, wherein
the transition voltage application section applies the transition voltage to the counter electrode after application of the transition voltage to the storage capacitor bus line and just before an end of the application of the transition voltage to the storage capacitor bus line.

6. The liquid crystal display device as set forth in claim 1, wherein
the transition voltage application section applies the transition voltage to the counter electrode while changing the transition voltage with time.

7. The liquid crystal display device as set forth in claim 1, wherein
the transition voltage application section applies the transition voltage to the storage capacitor bus line and the counter electrode, the transition voltage being homopolar.

8. The liquid crystal display device as set forth in claim 1, wherein
the pixel electrode is a transparent electrode.

9. A drive method for driving a liquid crystal display device,
the liquid crystal display device including:
an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied;

the liquid crystal display device further including:
a storage capacitor bus line provided on the pixel electrode so as to be opposite to the counter substrate with an insulating film between the storage capacitor bus line and the pixel electrode;
and an opening provided at a part of the pixel electrode at a region where the pixel electrode and the storage capacitor bus line intersect, the method comprising applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

10. The method as set forth in claim 9, comprising
applying the transition voltage to the counter electrode after application of the transition voltage to the storage capacitor bus line and occurrence of twist orientation at the opening.

11. A liquid crystal panel drive device for driving a liquid crystal panel including:
an active matrix substrate including a pixel electrode; and a counter substrate including a counter electrode, the active matrix substrate and the counter substrate being provided with a liquid crystal layer therebetween, the liquid crystal layer being in an OCB mode in which orientation is spray orientation when no voltage is applied and the orientation is changed to bend orientation when a voltage is applied;
a storage capacitor bus line provided on the pixel electrode so as to be opposite to the counter substrate with an insulating film between the storage capacitor bus line and the pixel electrode; and
an opening provided at a part of the pixel electrode at a region where the pixel electrode and the storage capacitor bus line intersect
the device comprising
a transition voltage application section provided for applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

12. The device as set forth in claim 11, wherein the transition voltage application section applies the transition voltage to the counter electrode after application of the transition voltage to the storage capacitor bus line and occurrence of twist orientation at the opening.

13. A liquid crystal panel drive method for driving a liquid crystal panel,
the liquid crystal panel including:
an active matrix substrate including a pixel electrode; and a counter substrate including a counter electrode, the active matrix substrate and the counter substrate being provided to be opposed to each other with a liquid crystal layer therebetween, the liquid crystal layer being in an OCB mode in which orientation is spray orientation when no voltage is applied and the orientation is changed to bend orientation when a voltage is applied;
a storage capacitor bus line provided on the pixel electrode so as to be opposite to the counter substrate with an insulating film between the storage capacitor bus line and the pixel electrode; and an opening provided at a part of the pixel electrode at a region where the pixel electrode and the storage capacitor bus line intersect, the method comprising applying a transition voltage to the storage capacitor bus line so as to apply an electric field between the pixel electrode and the storage capacitor bus line and thereafter applying a transition voltage to the counter electrode so as to apply an electric field between the pixel electrode and the counter electrode.

14. The method as set forth in claim 13, comprising applying the transition voltage to the counter electrode after application of the transition voltage to the storage capacitor bus line and occurrence of twist orientation at the opening.

* * * * *